United States Patent
Schröter et al.

(10) Patent No.: US 10,429,066 B2
(45) Date of Patent: Oct. 1, 2019

(54) APPARATUS AND METHOD FOR THERMAL EXHAUST GAS PURIFICATION

(71) Applicant: DÜRR SYSTEMS AG, Bietigheim-Bissingen (DE)

(72) Inventors: Martin Schröter, Ann Arbor, MI (US); Erhard Rieder, Herrenberg (DE)

(73) Assignee: DÜRR SYSTEMS AG, Bietigheim-Bissingen (DE)

( * ) Notice: Subject to any disclaimer, the term of this patent is extended or adjusted under 35 U.S.C. 154(b) by 112 days.

(21) Appl. No.: 15/622,333

(22) Filed: Jun. 14, 2017

(65) Prior Publication Data

US 2017/0276347 A1 Sep. 28, 2017

Related U.S. Application Data

(63) Continuation-in-part of application No. PCT/EP2015/079685, filed on Dec. 15, 2015.

(30) Foreign Application Priority Data

Dec. 22, 2014 (DE) .......... 10 2014 226 882
Mar. 26, 2015 (DE) .......... 10 2015 205 516

(51) Int. Cl.
*F23G 7/06* (2006.01)
*F23J 15/00* (2006.01)

(52) U.S. Cl.
CPC .......... *F23G 7/061* (2013.01); *F23G 7/066* (2013.01); *F23G 7/068* (2013.01); *F23J 15/006* (2013.01); *F25J 2260/02* (2013.01); *Y02E 20/12* (2013.01)

(58) Field of Classification Search
CPC .................... F23G 7/06; F23J 15/00
(Continued)

(56) References Cited

U.S. PATENT DOCUMENTS 5,028,409 A * 7/1991 Gitman .............. C01B 17/0417
423/574.1
8,142,555 B2 * 3/2012 Uji .................... F01K 17/04
96/143
(Continued)

FOREIGN PATENT DOCUMENTS

CN 102733872 A 10/2012
CN 202483648 U 10/2012
(Continued)

OTHER PUBLICATIONS

German Search Report from German Patent Application No. 102015205516.7, dated Oct. 6, 2015.
(Continued)

*Primary Examiner* — Gregory L Huson
*Assistant Examiner* — Nikhil P Mashruwala
(74) *Attorney, Agent, or Firm* — Greer, Burns & Crain, Ltd.

(57) ABSTRACT

An apparatus for thermal exhaust gas purification includes at least one thermal reactor to which a raw gas to be purified is supplied and in which the supplied raw gas is thermally purified, and an energy recovery apparatus to which a gas purified in the thermal reactor is supplied via at least one outlet line. For improving the balance of energy, it is proposed that the energy recovery apparatus includes at least one condensation heat exchanger in which the purified gas is cooled down such that condensable substances contained in the purified gas condense, and enthalpies released thereby are transmitted to a heat exchange medium and/or the raw gas upstream of the thermal reactor.

21 Claims, 8 Drawing Sheets

(58) Field of Classification Search
USPC .................................................. 431/5; 96/143
See application file for complete search history.

(56) References Cited

U.S. PATENT DOCUMENTS

| | | | |
|---|---|---|---|
| 8,757,248 B2 | 6/2014 | Postma et al. | |
| 8,795,616 B2* | 8/2014 | Leung | C04B 7/4446 106/704 |
| 8,899,011 B2* | 12/2014 | Hueller | C01F 11/464 423/242.1 |
| 9,134,022 B2* | 9/2015 | Hunsinger | F23B 80/02 |
| 9,334,453 B2* | 5/2016 | Chalabi | C10B 7/14 |
| 2013/0145763 A1 | 6/2013 | Mirmobin et al. | |
| 2013/0145769 A1* | 6/2013 | Norris | F02K 3/105 60/772 |
| 2015/0308744 A1* | 10/2015 | Fukuda | B01D 53/504 422/168 |
| 2016/0334175 A1 | 11/2016 | Eckert et al. | |
| 2018/0306509 A1* | 10/2018 | Fukuda | B01D 53/504 |

FOREIGN PATENT DOCUMENTS

| | | |
|---|---|---|
| CN | 103244214 U | 8/2013 |
| CN | 103939932 A | 7/2014 |
| DE | 4003668 A1 | 8/1990 |
| DE | 4116348 A1 | 11/1992 |
| EP | 0304532 A1 | 3/1989 |
| WO | 2008/011965 A1 | 1/2008 |

OTHER PUBLICATIONS

International Search Report from International Patent Application No. PCT/EP2015/079685, dated Mar. 3, 2016.
Chinese Office Action from corresponding Chinese Patent Application No. 201580070144.7, dated Jun. 20, 2019.

* cited by examiner

APPARATUS AND METHOD FOR THERMAL EXHAUST GAS PURIFICATION

CROSS-REFERENCE

This application is a Continuation-In-Part of, and claims 35 USC 120 priority from, PCT Patent Application No. PCT/EP2015/079685 filed Dec. 15, 2015, and also claims priority from German Application No. 102014226882.6, filed Dec. 22, 2014 and German Application No. 102015205516.7, filed Mar. 26, 2015, under 35 U.S.C. § 119, which are all incorporated herein by reference.

BACKGROUND

The present invention relates to an apparatus and a method for thermal exhaust gas purification, in particular for purifying a mine exhaust gas or a mine exhaust, especially a methane-containing mine-ventilating gas. However, the present invention can also be used for thermal purification of other exhaust gases or exhausts containing flammable constituents, in particular volatile organic components (VOC).

It is known to use a thermal reactor for purifying mine exhaust gases, especially methane-containing mine ventilation gases (VAM), and to supply the hot gas produced during the thermal oxidation process to an energy recovery means. For example, CN 102733872 A proposes to utilize the heat energy of the hot gas to generate or further heat the water vapor which is used to drive a steam turbine coupled to a generator for generating electrical current.

The inventors have recognized that the energy efficiency of this process, as well as of many other heat exchange processes, is limited by the exclusive utilization of the calorific value (upper heating value) or the enthalpy difference between a heat exchange inlet temperature and a heat exchange outlet temperature. In many cases, utilization of the fuel value (lower heating value) of fuels or general utilization of the condensation energy of moist components of the (exhaust) gas is limited by the operating conditions of the secondarily generated energy form. This also applies, for example, to the generation of steam in the boiler operation of a power generation process.

Conventional methods (cf. e.g. CN 102733872 A) utilize the enthalpy difference of a hot gas stream heated by an upstream process for generating water vapor in the boiler operation. If such hot gas streams are produced in a combustion process of hydrocarbons or if these contain, for some other reason, larger amounts of condensable constituents, such as, for example, in a methane-containing mine ventilation gas, the condensation enthalpy is not utilized. On the contrary, in the case of larger amounts of water vapor in the gas stream, a disproportionately large quantity of the enthalpy inherent in the hot gas stream is bound in the form of evaporation enthalpy and thus is withdrawn from or not supplied to the energy transfer in the boiler.

SUMMARY

It is the object of the invention to provide an improved apparatus and an improved method for thermal exhaust gas purification, which have an improved energy balance.

The apparatus for thermal exhaust gas purification according to the invention comprises a thermal reactor, to which a raw gas to be purified can be supplied and in which the supplied raw gas can be thermally purified, and an energy recovery means to which a gas purified in the thermal reactor can be supplied via at least one outlet line. The energy recovery means in turn comprises at least one condensation heat exchanger in which the purified gas can be cooled down such that condensable substances contained in the purified gas condense, and enthalpies released thereby can be transmitted to a heat exchange medium and/or the raw gas upstream of the thermal reactor.

Preferably, the thermal reactor comprises a combustion chamber in which the supplied raw gas can be thermally purified. The energy recovery means is preferably connected to the combustion chamber of the thermal reactor via an outlet line in order to supply a purified gas resulting from the thermal purification process in the combustion chamber to the energy recovery means. Further, the energy recovery means preferably comprises a further heat exchanger in which the purified gas can be cooled down to a first temperature level and an enthalpy released thereby can be transmitted to a heat exchange medium, as well as the condensation heat exchanger which is arranged downstream of the further heat exchanger and in which the purified gas can be further cooled down to a second temperature level lower than the first temperature level so that condensable substances contained in the purified gas condense and enthalpies released thereby can be transmitted to a heat exchange medium and/or the raw gas upstream of the thermal reactor.

Preferably, the thermal reactor is a thermal oxidation reactor which is preferably designed for regenerative thermal oxidation (RTO) and is described, for example, in WO 2008/011965 A1 of the applicant, the content of which regarding this aspect is completely made to the subject-matter of the present invention. In this connection, the thermal reactor can in particular be an RTO reactor having two, three, four or more regenerators or containers.

The method for thermal exhaust gas purification according to the invention includes the steps of thermally purifying a raw gas to be purified in a thermal reactor; and cooling down a purified gas produced in the thermal purification process in the thermal reactor in a condensation heat exchanger such that condensable substances contained in the purified gas condense, wherein enthalpies released thereby are transmitted to a heat exchange medium and/or the raw gas upstream of the thermal reactor.

Preferably, the thermal purification of the raw gas is carried out in a combustion chamber of the thermal reactor. The purified gas produced during the thermal purification process in the combustion chamber is preferably cooled down to a first temperature level in a further heat exchanger, wherein an enthalpy released thereby is transmitted to a heat exchange medium. Further, the purified gas is preferably cooled further down to a second temperature level lower than the first temperature level in the condensation heat exchanger downstream of the further heat exchanger so that condensable substances contained in the purified gas condense and enthalpies released thereby are transmitted to a heat exchange medium and/or the raw gas upstream of the thermal reactor.

Preferably, the thermal purification of the raw gas is carried out in a thermal oxidation reactor, which is preferably designed for regenerative thermal oxidation (RTO) and is described, for example, in WO 2008/011965 A1 of the applicant, the content of which regarding this aspect is completely made to the subject-matter of the present invention. In this connection, the thermal reactor can in particular be an RTO reactor having two, three, four or more regenerators or containers.

According to a preferred configuration of the invention, an enthalpy difference between the inlet temperature and the outlet temperature (first temperature level of the invention) of the purified hot gas into resp. from the first heat exchanger can be utilized in a first heat exchanger (further heat exchanger of the invention) of the energy recovery means. In addition, in the second heat exchanger (condensation heat exchanger of the invention) of the energy recovery means, the vaporization enthalpy inherent in the hot gas can also be utilized by condensation of the moisture in the hot gas. In this way, depending on the type of the condensing second heat exchanger, for example, about 60-70% of the temperature difference between the outlet temperature of the hot gas from the first heat exchanger and the condensation temperature of the moisture (typically water vapor) and the vaporization enthalpy can be transmitted to the heat exchange medium.

In this connection, the thermal purification process is to cover all types of purifying processes in which heat energy is supplied to the raw gas to be purified. These include in particular thermal oxidation processes of combustible substances contained in the raw gas to be purified.

In this connection, the outlet line in particular covers a so-called clean gas line through which the gases purified in the thermal reactor are removed from the thermal reactor as a so-called clean gas, after flowing through the regenerator, with corresponding cooling down (to e.g. about 70° C.), and a so-called hot gas line through which the gases purified in the thermal reactor are removed from the combustion chamber of the thermal reactor as a so-called hot gas, after thermal purification in the thermal reactor, with corresponding heating (to e.g. about 1000° C.). Accordingly, in this connection, the purified gas in particular covers the so-called clean gas and the so-called hot gas.

According to the invention, in the condensation heat exchanger of the energy recovery means "condensable substances contained in the purified gas are to condense". Within the sense of the invention, this is also to be understood such that at least one condensable substance component containing the purified gas as a substance mixture at least partially condenses in the condensation heat exchanger. Preferably, at least one condensable main component of the substance mixture is at least partially condensed, wherein a condensable main component is to be understood as a substance component whose condensation enthalpy has at least 50% of the total condensation enthalpy of all condensable substance components present in the substance mixture.

According to the invention, it is proposed in particular to also utilize the energy latent in the (raw) gas in the form of relative humidity by means of a condensation heat exchanger connected downstream of the RTO reactor, and thus to improve the energy balance of the entire process. This approach is based in particular on the following considerations. The raw gas to be supplied to the exhaust gas purification system may contain not only gaseous constituents but also a significant proportion of moisture (in the form of condensable substances). The proportion of the moisture components before entering the post-combustion system can exceed the saturation point, and portions of the steam can start to condense due to a temperature decrease between the raw gas source and the entry into the post-combustion system, respectively. The small liquid drops resulting thereby, however, are entrained by the high flow velocity of the raw gas stream and thus enter the thermal reactor. There, some of the heat stored in the regenerator of the thermal reactor is spent to evaporate the liquid again, so that this fraction is initially not available for heating the raw gas and for initiating the oxidation reactions. This latently stored heat is also not transmitted to the heat storage mass via the outlet-side regenerator of the thermal reactor, so that the thermal reactor cannot operate with optimum efficiency overall. The condensation heat exchanger which is, according to the invention, connected downstream to the thermal reactor utilizes this latently stored heat, so that the overall efficiency of the plant can be restored to a level which corresponds to that of typical TNV installations when converting essentially arid raw gases, even in case of moist, steam-saturated raw gases. That is, the present invention can be used particularly advantageously in processes in which the raw gas supplied to the thermal reactor contains liquid drops, but without being restricted to this application.

In a preferred configuration of the invention, the further heat exchanger and the condensation heat exchanger are in heat exchange with a common heat exchange medium circuit. In this case, the condensation heat exchanger is preferably arranged upstream of the further heat exchanger in the common heat exchange medium circuit, and the heat exchange medium of the common heat exchange medium circuit can preferably be preheated in the condensation heat exchanger.

In another preferred configuration of the invention, the further heat exchanger is in heat exchange with a first heat exchange medium circuit, and the condensation heat exchanger is in heat exchange with a second heat exchange medium circuit being separate from the first heat exchange medium circuit.

In another preferred configuration of the invention, the further heat exchanger is in heat exchange with a first heat exchange medium circuit, and the condensation heat exchanger is in heat exchange with a raw gas supply line upstream of the thermal reactor.

In yet another preferred configuration of the invention, a further condensation heat exchanger is provided downstream of the further heat exchanger in the common heat exchange medium circuit, which is in heat exchange with a raw gas supply line upstream of the thermal reactor.

In this context, the term "circuit" is intended to cover both closed and open circuits.

In a preferred configuration of the invention, a power generating device is arranged downstream of the further heat exchanger in the common heat exchange medium circuit or the first heat exchange medium circuit. That is, the heat exchange medium heated in the further heat exchanger is preferably used for generating electricity. The power generating device preferably comprises a steam turbine connected in the circuit and a generator coupled to the steam turbine for generating electric current.

In a further preferred configuration of the invention, at least one warm and/or hot water consumer and/or a district heating terminal are arranged downstream of the condensation heat exchanger in the second heat exchange medium circuit. In other words, the heat exchange medium of the second heat exchanger is preferably a process water or a heating medium. Alternatively, it can also be provided that the second heat exchange medium circuit serves as a heat source for the operation of an ORC system. In this case, either an intermediate medium, for example, a thermal oil, can be provided in the second heat exchange medium circuit for the heat transfer to an ORC system, or alternatively, the second heat exchange medium circuit can be directly a working medium circuit of an ORC system, wherein the second heat exchanger can operate as an evaporator for a working medium of the ORC system.

In a further preferred configuration of the invention, a condensate generated in the condensation heat exchanger of the energy recovery means can be recycled to the process via a condensate drain. For example, the condensate can be supplied to a heat exchange medium circuit as a heat exchange medium.

In another preferred configuration of the invention, the condensation heat exchanger of the energy recovery means transfers the residual and/or condensation enthalpy to the raw gas stream to be treated, especially methane-containing mine ventilation gas (VAM), before entering the thermal reactor. In this variant, small amounts of drops contained in the raw gas stream can be evaporated. In addition, correspondingly more energy can be withdrawn from the thermal reactor for primary energy recovery in the further heat exchanger.

In another alternative or complementary configuration of the invention, the condensation heat exchanger of the energy recovery means utilizes the residual and/or condensation enthalpy of the purified clean gas stream flowing out of the (regenerative) thermal reactor via a clean gas outlet line as heat source and transmits this to a heat exchange medium in the second heat exchange medium circuit. This variant can be advantageous in particular if an outlet temperature of the clean gas stream in the clean gas outlet line is above the dew point of a steam component in the exhaust stream, in particular min. 80° C., preferably min. 90° C., preferably min. 100° C. or higher. Alternatively, it can also be provided that the condensation heat exchanger is supplied with both the exhaust gas stream from the clean gas outlet line and the hot gas leaving the further heat exchanger as a heat source for heat transfer to the heating medium in the second heat exchange medium circuit.

In further variants, it may also be provided that, in addition to the afore-mentioned heat exchangers, in a sequential arrangement in the hot gas line, the energy recovery means also comprises a further heat exchanger for condensing the humidity of the clean gas of the thermal reactor flowing in the clean gas line so that also the evaporation enthalpy inherent in this clean gas becomes utilizable. This variant can be advantageous in particular if an outlet temperature of the (cooler) clean gas stream in the clean gas line is above the dew point of a steam component in the exhaust gas stream, in particular min. 80° C., preferably min. 90° C., preferably min. 100° C. or higher.

The above-described apparatus of the invention and the above-described method of the invention can be used particularly advantageously for purifying a mine exhaust gas, in particular a Ventilation Air Methane (VAM) or a mixture of Ventilation Air Methane (VAM) and Coal Mine Methane (CMM).

During the production of the coal mine, plenty of methane stored in the coal seam will be released to the mining space. In order to assure the ventilation air safety of the underground, huge amount of fresh air is pushed into the coal mine underground and then emitted to the atmosphere with extremely low methane concentration (below 0.75%). The methane-containing mine ventilation gas is called Ventilation Air Methane (VAM).

Especially in a few high gassy mines, due to the methane concentration at the working surface greatly exceeding the safety standard as stipulated in Coal Mine Safety Regulation, however, it is difficult to restrict the methane concentration at the working surface within the allowable scope purely by adopting the ventilation method. In the coal and gas outburst mine, the outburst danger is a great threat to the coal mine workers' life and the coal mine production safety. In this circumstance, the gas drainage method must be adopted to improve the coal mine production safety condition and alleviate the production pressure. In order to reduce and relive the threat of the coal mine methane safe production, the mechanical equipment and the special pipelines are utilized to create a negative pressure, which can extract the methane from the coal seam and transport it to the ground surface and other safe places. This method is called methane drainage.

The coal mine methane is divided into high-concentration and low-concentration methane. The high-concentration methane has a methane concentration exceeding 30%, the low-concentration methane has a methane concentration below 30%. According to the Coal Mine Safety Regulation, the low-concentration coal mine methane is not allowed to be stored in the gasholder, and thus, majority of the methane is directly vented into the atmosphere. On the one hand, the direct emission of the low-concentration coal mine methane creates huge waste of non-renewable resources. On the other hand, it exacerbates the air pollution and global warming. Therefore, VAM and CMM are collected and supplied to a thermal exhaust gas purification system, preferably to an RTO equipment for oxidation treatment, to be converted to $CO_2$ and $H_2O$, whereby the elimination of methane vented into the atmosphere can be achieved.

In addition, for reducing underground dust build-up, moisture in the range of, for example, 30 to 35 Vol.-% can be added to the ventilation air of coal mines in the suction process. The invention makes the enthalpy of this moisture in the drain stream of the thermal reactor utilizable in the energy recovery.

With the above-described invention, in particular, the following advantages can be obtained:

utilization also of the evaporation enthalpy of the moisture contained in the purified gas, in particular in the hot gas (→improvement of the energy balance);

minimization of water consumption by recycling the condensate into the circuit including the further heat exchanger or another process (→improvement of resource balance);

increasing the performance of the further heat exchanger with the same energy and/or fuel consumption;

minimizing the $CO_2$ emissions of the energy generating process upstream of the energy recovery means;

improved energy balance, in particular for raw gases containing liquid drops;

obtaining a drier exhaust stream from the exhaust gas purifying apparatus.

The above and further advantages, features and possible applications of the invention will be better understood from the following description of various exemplary embodiments with reference to the accompanying drawings.

DETAILED DESCRIPTION

Figure 1:
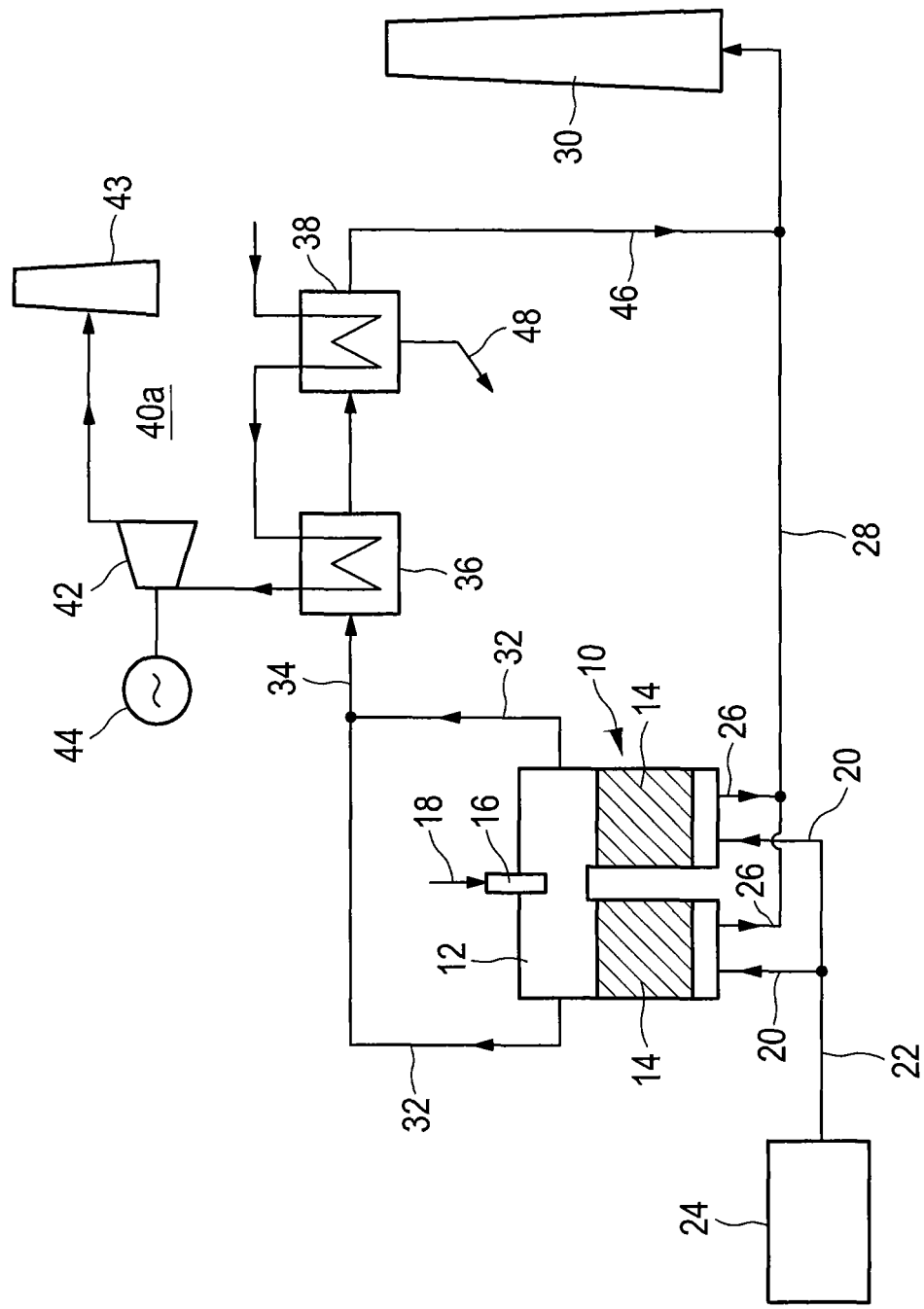
FIG. 1 is a schematic view showing the configuration of a thermal exhaust gas purification apparatus according to a first exemplary embodiment of the invention.

FIG. 1 shows a system for purifying a methane-containing mine ventilation gas (VAM) according to a first exemplary embodiment of the present invention.

The system illustrated in FIG. 1 comprises, in addition to the components described below and shown in the drawing, in particular also numerous (regulating) valves and sensors (in particular temperature sensors) which are omitted for the sake of simplicity, but which are known, for example, from WO 2008/011965 A1.

The thermal exhaust gas purification apparatus of FIG. 1 includes a thermal reactor 10 for regenerative thermal oxidation (RTO) of combustible substances in an exhaust or exhaust gas stream. The thermal reactor 10 comprises a combustion chamber 12 and two regenerators 14 arranged below the combustion chamber 12 and each comprising a channel and a heat storage mass chamber arranged above the channel. In the exemplary embodiment shown, the thermal reactor 10 comprises two regenerators 14, but in other embodiments three, four or more regenerators 14 can also be provided below the combustion chamber 12.

A burner 16 projects into the combustion chamber 12 of the thermal reactor 10, to which fuel gas and combustion air are supplied via a gas supply 18. The burner 16 serves to burn the pollutants (e.g. methane) contained in the raw gas to be purified. The temperature in the combustion chamber 12 in operation can be up to about 1000° C.—depending on the energy content of the combustible substances contained in the raw gas.

The channel of each regenerator 14 of the thermal reactor 10 is connected to a raw gas supply line 22 via a raw gas branch line 20. An exhaust gas source 24, for example in the form of an exhaust manifold and exhaust gas mixing device feeds the raw gas supply line 22 with the exhaust gas (raw gas) to be purified.

The exhaust gas to be purified, which is supplied to the regenerators 14 of the thermal reactor 10 via the raw gas branch lines 20, usually contains liquid drops. These liquid drops originate, for example, from the upstream process 24. This condition can also occur, for example, if the temperature difference between the upstream process 24 and the raw gas inlet into the exhaust gas purification system at the transfer point from the raw gas supply line 22 into the raw gas branch lines 20 results in a condensation of the moisture contained in the raw gas, which are transported as liquid drops in the resulting gas stream at the outlet of the raw gas branch lines 20 into the thermal reactor 10.

Furthermore, the channel of each regenerator 14 of the thermal reactor 10 is connected to a clean gas line (first outlet line of the invention) 28 via a respective clean gas branch line 26. The gas (purified gas) purified in the thermal reactor 10 and cooled in the regenerator 14 is fed through the clean gas line 28 to a vent stack 30, via which the clean gas is released to the environment.

The functioning of such a thermal reactor is described in more detail, for example, in WO 2008/011965 A1. In this regard, reference is made to this document in its entirety.

As shown in FIG. 1, the combustion chamber 12 of the thermal reactor 10 is connected to a hot gas line (second outlet line of the invention) 34 via hot gas branch lines 32. With this hot gas line 34, hot exhaust gas (hot gas) purified by thermal oxidation is by-passed around the regenerator 14 or removed from the exhaust gas purification apparatus before passing through a regenerator 14. In preferred configurations, the hot gas is supplied to an energy recovery means via the hot gas line 34.

This energy recovery means comprises a first heat exchanger 36 (further heat exchanger of the invention) and a second heat exchanger 38 (condensation heat exchanger of the invention) downstream of the first heat exchanger 36. Both heat exchangers 36, 38 are in heat exchange with a common heat exchange medium circuit 40*a*.

The first heat exchanger 36 serves as a steam generator or steam heater. In the first heat exchanger, the hot gas is cooled down from, for example, about 1000° C. to, for example, about 400° C. (first temperature level). Depending on the design and/or efficiency of the first heat exchanger 36 and/or the inlet temperature of the hot gas at the first heat exchanger 36, the first temperature level may also be below 400° C., for example at about 300° C., 200° C. or even approx. 150° C. The enthalpy released during this cooling is utilized in the first heat exchanger 36 for heating the heat exchange medium (here: water) of the circuit 40*a* up to vaporization and overheating of the steam.

The steam overheated by the first heat exchanger 36 is supplied to a steam turbine 42 in the circuit 40*a*. This steam turbine 42 is coupled to a generator 44 for power generation in order to generate electrical energy in a known manner. Downstream of the steam turbine 42, preferably a cooling tower 43 is provided for further cooling down of the water.

In the second heat exchanger 38, the hot gas emerging from the first heat exchanger 36 is cooled further down, for example to about 60° C. (second temperature level). During this cooling process, the moist components of the hot gas condense.

If the first temperature level is below about 230° C., in particular between 200° C. and 100° C., preferably at about 150° C., the second heat exchanger 38 can be produced cost-effectively from carbon or plastic material. Such heat exchangers are known, for example, from WO 2009/007065 A1, the disclosure of which is hereby incorporated by reference.

In this process, the hot gas releases the inherent enthalpy between the inlet and outlet temperatures into resp. out of the second heat exchanger 38, the evaporation enthalpy of the moisture contained in the hot gas by condensation, and the enthalpy inherent in the condensate between the inlet and outlet temperatures into resp. out of the second heat exchanger 38. The sum of these released enthalpies is transmitted to the heat exchange medium of the circuit 40*a* to preheat the heat exchange medium.

The exhaust gas purification apparatus described above enables an efficient energy recovery, in particular also in the case that the raw gas supplied via the raw gas branch lines 20 is oversaturated and contains moisture in the form of liquid drops. During the heating process in the thermal reactor, these liquid drops are evaporated. If the evaporation product does not emit any reaction energy in the thermal reactor, as it is the case, for example, for water, which can pass through the thermal reactor as a vapor, the evaporation enthalpy used for the evaporation of the liquid is recovered in the condensation heat exchanger 38 by condensation and, in this embodiment, transmitted to a heating medium for further use.

The hot gas emerging from the second heat exchanger 38 is finally supplied to the clean gas line 28 via a connecting line 46, in order to be finally delivered to the environment via the vent stack 30. The exhaust stream in the vent stack 30 is also relatively dry because of the condensation heat exchanger 38 used in the energy recovery means.

As indicated in FIG. 1, the condensate produced during the cooling of the hot gas in the second heat exchanger 38 can optionally be returned to the process via a condensate drain 48. For example, the condensate can be supplied to the circuit 40a as a heat exchange medium.

Figure 2:
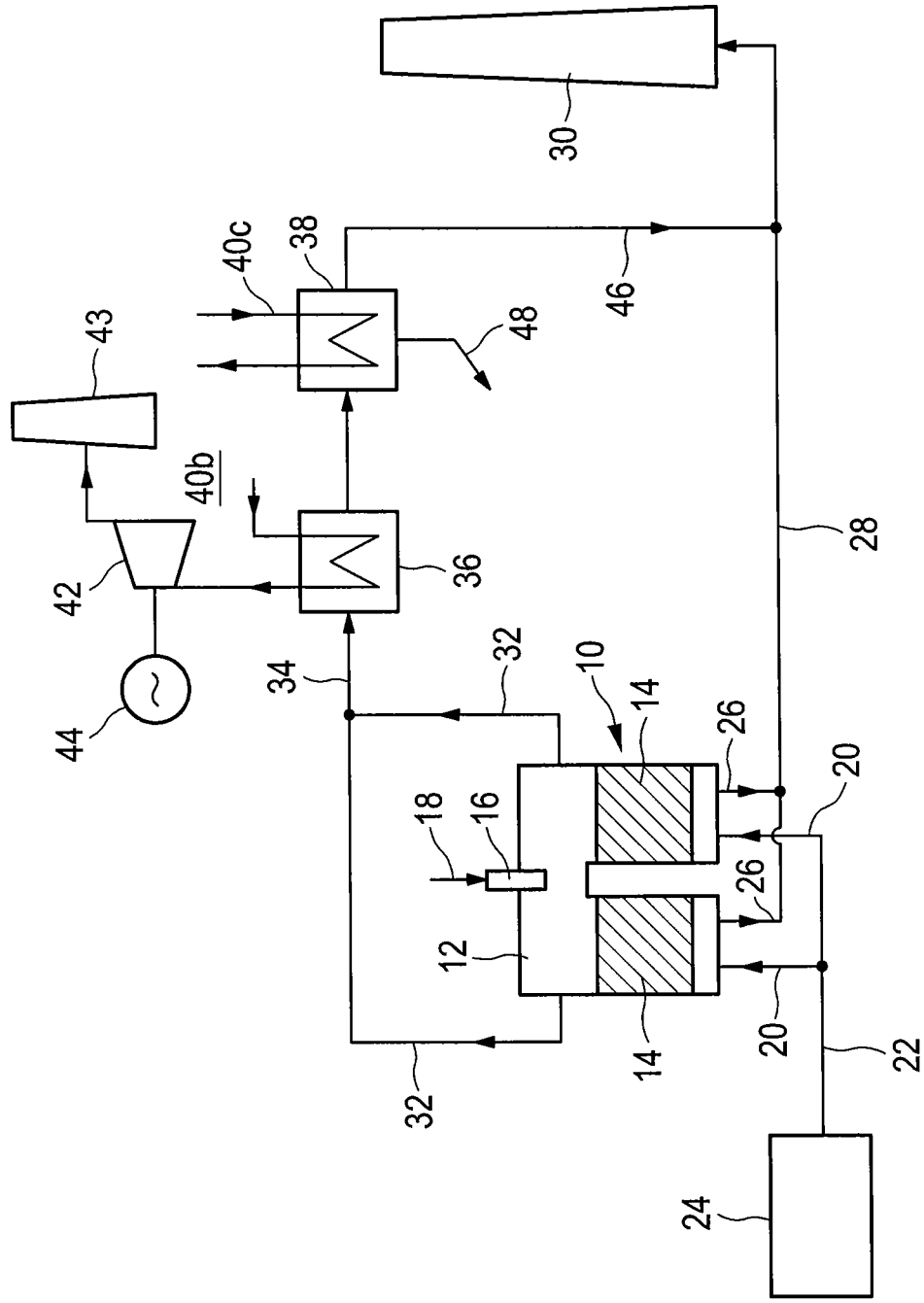
FIG. 2 is a schematic view showing the configuration of a thermal exhaust gas purification apparatus according to a second exemplary embodiment of the invention.

FIG. 2 shows a system for purifying a methane-containing mine ventilation gas according to a second exemplary embodiment of the present invention. Identical or analogous components are identified by the same reference numerals, and a repetition of the corresponding description is omitted.

The exhaust gas purification apparatus illustrated in FIG. 2 differs from that of the first exemplary embodiment in the energy recovery means.

As shown in FIG. 2, the first heat exchanger 36 (further heat exchanger of the invention) of the energy recovery means is in heat exchange with a first heat exchange medium circuit 40b. This first heat exchange medium circuit 40b, like the common heat exchange medium circuit 40a of the first exemplary embodiment, includes a power generation means comprising a steam turbine 42 and a generator 44 as well as a cooling tower 43.

The second heat exchanger 38 (condensation heat exchanger of the invention) of the energy recovery means is in heat exchange with a second heat exchange medium circuit 40c which is designed as an open circuit and is separate from the first heat exchange medium circuit 40b. The heat exchange medium of the second heat exchange medium circuit 40c is, for example, a process water which is supplied to a hot water consumer, or a heating medium which is supplied to a district heating terminal. However, it can also be provided that the heat exchange medium of the second heat exchange medium circuit 40c is a thermal oil of an intermediate circuit for coupling an RC, in particular an ORC system, or is directly a working medium of an RC, in particular of an ORC system. In the second case, the second heat exchanger 38 serves as a direct evaporator for a working medium, in particular an organic working medium, for the operation of a Rankine cycle plant, the Rankine turbine preferably driving a generator. In this way, an efficiency of the power generation of the entire system including the steam turbine 42 and the Rankine turbine can be increased.

Figure 3:
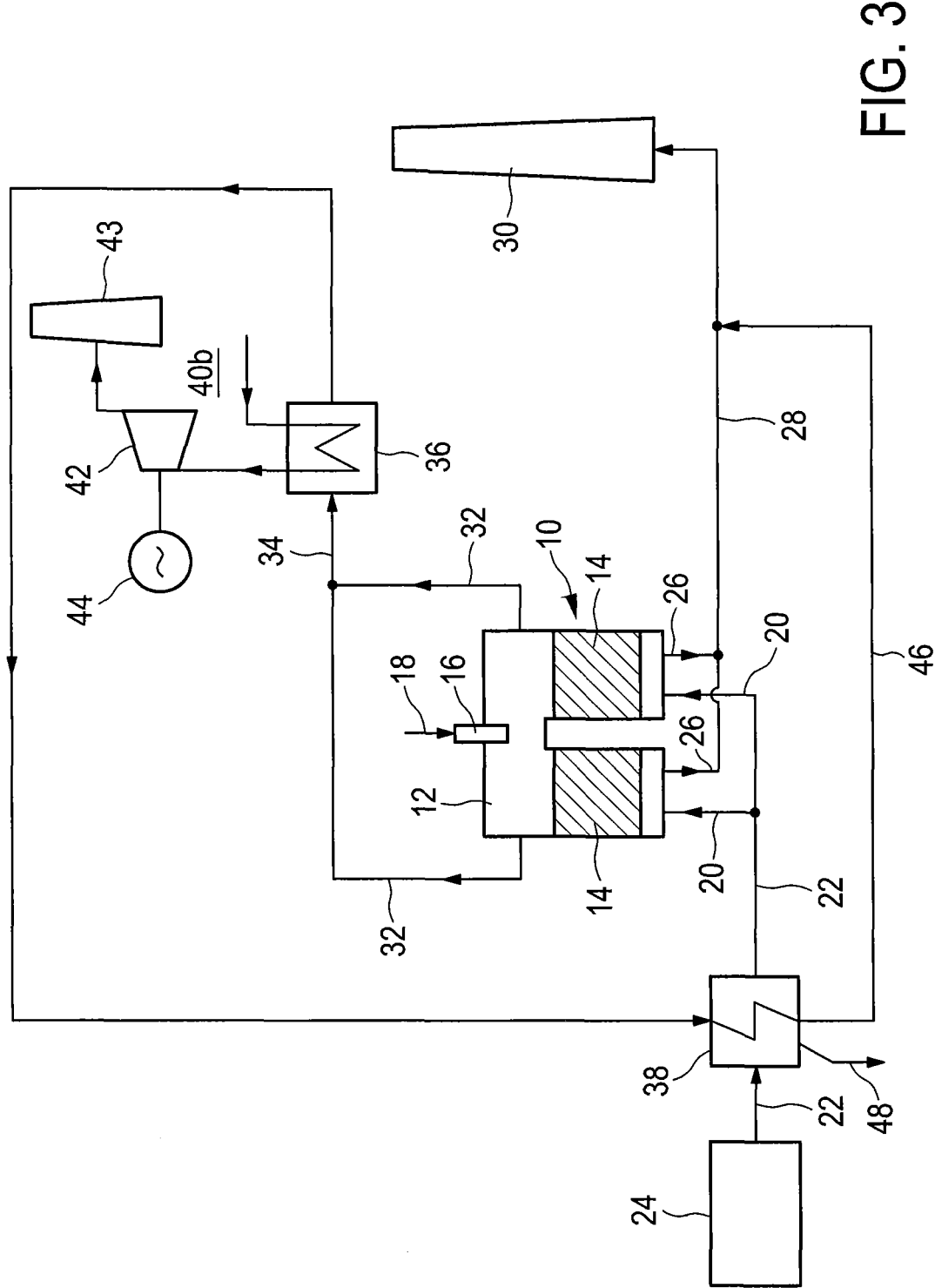
FIG. 3 is a schematic view showing the configuration of a thermal exhaust gas purification apparatus according to a third exemplary embodiment.

FIG. 3 shows a system for purifying a methane-containing mine ventilation gas according to a third exemplary embodiment of the present invention. Identical or analogous components are identified by the same reference numerals, and a repetition of the corresponding description is omitted.

The exhaust gas purification apparatus illustrated in FIG. 3 differs from those of the first two exemplary embodiments in the energy recovery means.

As shown in FIG. 3, the first heat exchanger 36 of the energy recovery means is in heat exchange with a first heat exchange medium circuit 40b. This first heat exchange medium circuit 40b, like the common heat exchange medium circuit 40a of the first exemplary embodiment and the first heat exchange medium circuit 40b of the second exemplary embodiment, includes a power generation means including a steam turbine 42 and a generator 44 as well as a cooling tower 43.

The second heat exchanger (condensation heat exchanger) 38 of the energy recovery means is in heat exchange with the raw gas stream, especially methane-containing mine ventilation gases (VAM), which is supplied from the exhaust gas source 24. Especially, the second heat exchanger 38 is arranged upstream of the thermal reactor 10 in the raw gas supply line 22. In the second heat exchanger 38, the hot gas emerging from the first heat exchanger 36 is cooled down, for example, from about 300° C. to about 200° C.

Figure 4:
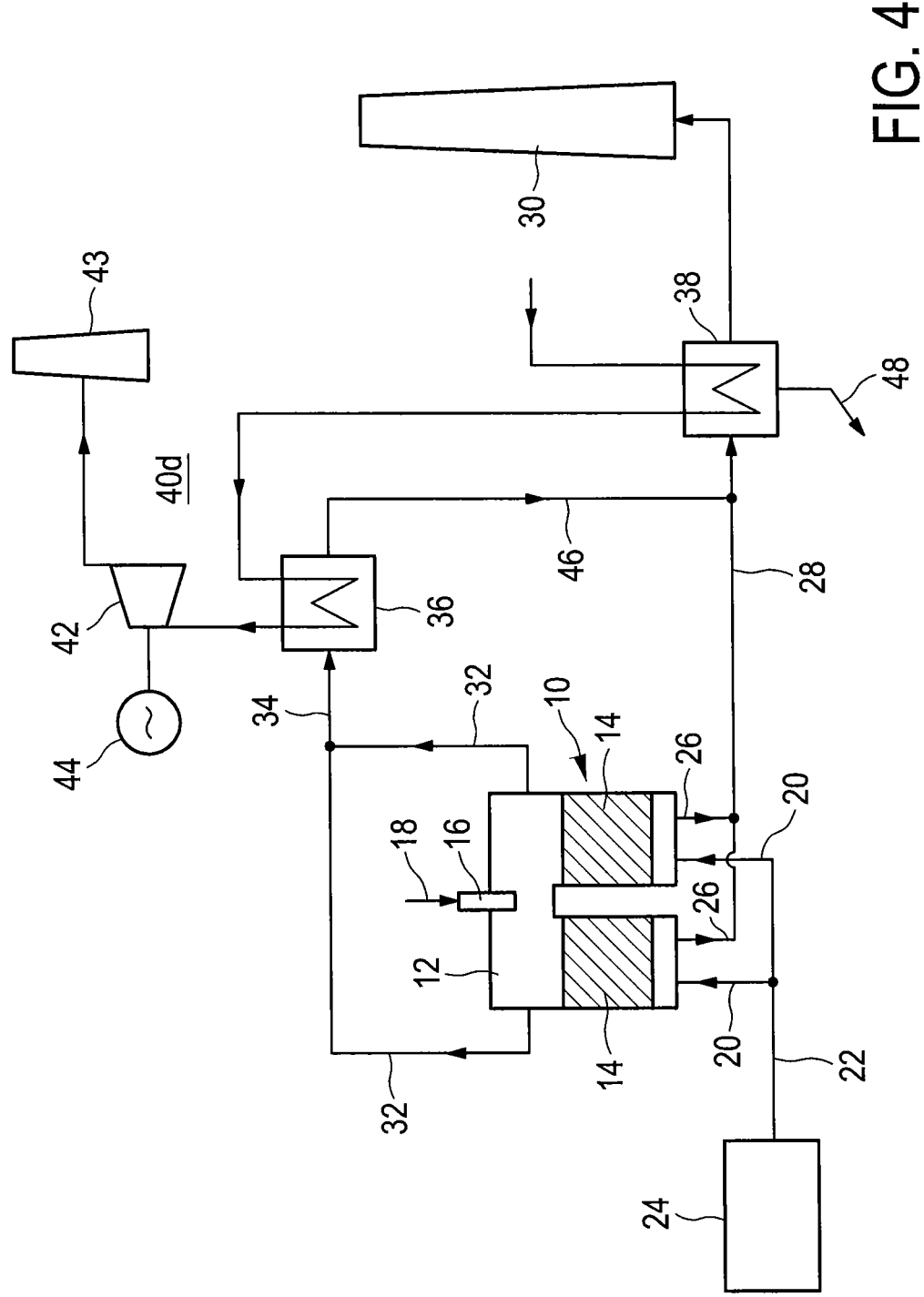
FIG. 4 is a schematic view showing the configuration of a thermal exhaust gas purification apparatus according to a fourth exemplary embodiment.

FIG. 4 shows a system for purifying a VOC-containing exhaust air from an exhaust gas source 24, for example a methane-containing mine ventilation gas or a solvent-containing process exhaust, according to a fourth exemplary embodiment of the present invention. Identical or analogous components are identified by the same reference numerals, and a repetition of the corresponding description is omitted.

The exhaust gas purification apparatus illustrated in FIG. 4 differs from the first exemplary embodiment according to FIG. 1 in that the cooler clean gas (e.g. approx. 70° C.) discharged via the clean gas line 28 is mixed with the hot gas (e.g. approx. 300° C.) exiting the first heat exchanger 36 of the energy recovery means before this mixed clean gas (e.g. approx. 180° C.) enters downstream into the second heat exchanger (condensation heat exchanger) 38 as a heat source. In the second heat exchanger 38, the mixed clean gas is then cooled over the dew point of a steam component, in particular water vapor, so that the vaporization enthalpy stored in both partial flows can be transferred to the heat exchange medium circulating in the common heat exchange medium circuit 40d.

It can also be provided that the admixture or supply of the gas streams is supported by a mixing and/or swirling means. By this, an advantageous mixing, in particular homogenization of the mixture of differently tempered gas streams can be promoted.

As an alternative to the configuration shown in FIG. 4, the residual and/or evaporation enthalpy of the gas mixture may also be transferred to a heat exchange medium circulating in the second heat exchange medium circuit 40c, analogously to the exemplary embodiment of FIG. 2.

The configuration variants thus characterized are particularly suitable if a mixture temperature below 250° C. can be established by the mixture formation between the hot gas of the first temperature level and the cooler clean gas of the outlet temperature from the thermal reactor 10, resulting in an advantageous and cheap realization of the second heat exchanger according to the nature of WO 2009/007065 A1.

Figure 5:
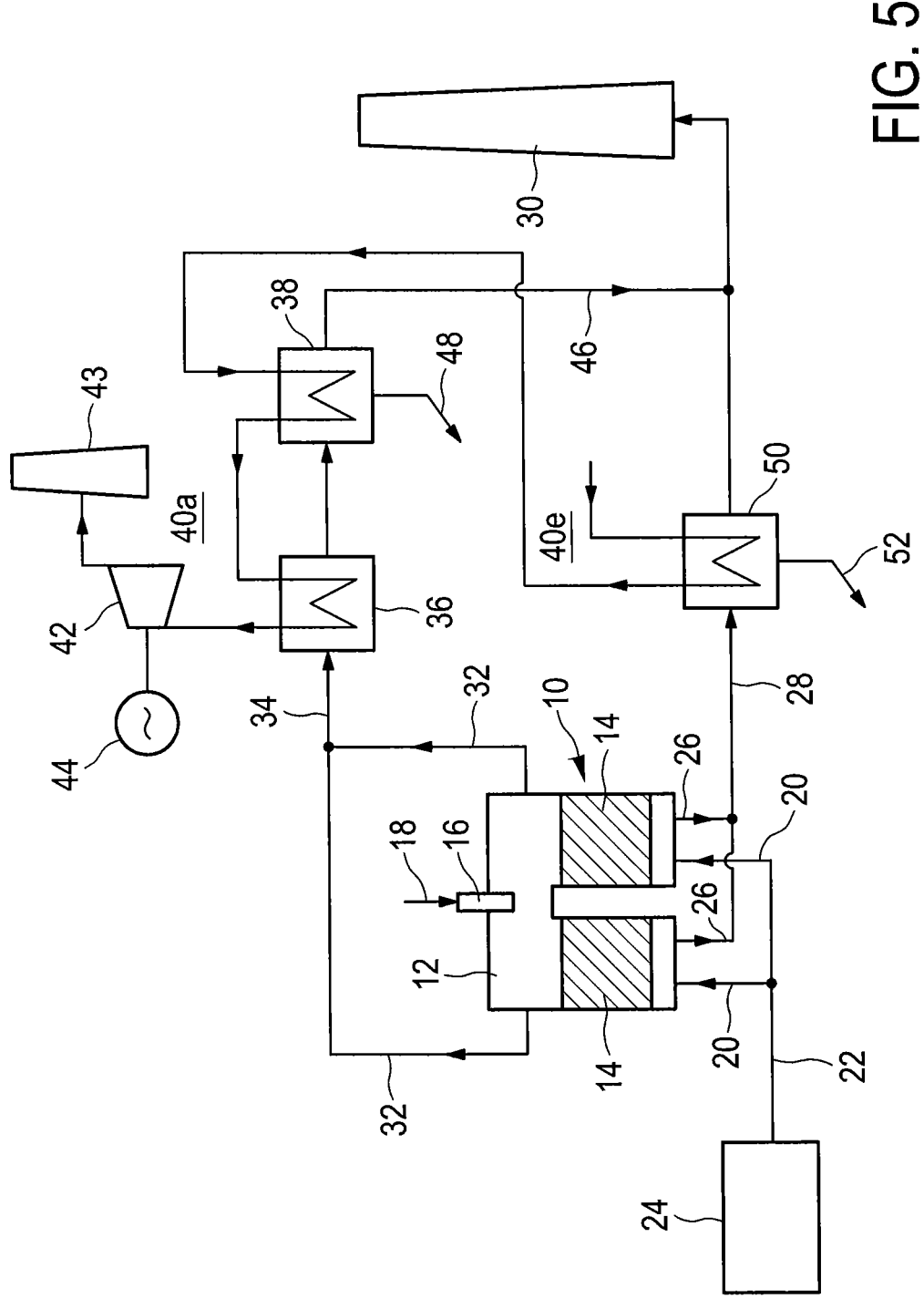
FIG. 5 is a schematic view showing the configuration of a thermal exhaust gas purifying apparatus according to a fifth exemplary embodiment.

FIG. 5 shows a system for purifying a VOC-containing exhaust air from an exhaust gas source 24, for example a methane-containing mine ventilation gas or a solvent-containing process exhaust, according to a fifth exemplary embodiment of the present invention. Identical or analogous components are identified by the same reference numerals, and a repetition of the corresponding description is omitted.

The exhaust gas purification apparatus illustrated in FIG. 5 differs from the second exemplary embodiment according to FIG. 2 in that a third heat exchanger 50 is provided in the clean gas line 28. In the third heat exchanger 50 (condensation heat exchanger of the invention), the clean gas emerging from the thermal reactor 10 via the clean gas line 28 is further cooled down, for example to about 60° C. (corresponding to the second temperature level of the second heat exchanger 38). During this cooling process, the moist components of the clean gas condense, whereby a residual and/or evaporation enthalpy of the clean gas can be transferred to a heat exchange medium.

In the variant shown in FIG. 5 of this exemplary embodiment, the first heat exchanger 36 and the second heat exchanger 38 are in heat exchange with a common heat exchange medium circuit 40a (similar to the first exemplary embodiment of FIG. 1). In addition, the second heat exchanger 38 and the third heat exchanger 50 are co-operating via a common heat exchange medium circuit 40e, the heat exchange medium being preheated in the third heat exchanger 50. As a result, all three heat exchangers 36, 38, 50 are co-operating via a common heat exchange medium circuit, whereby a steam formation for driving the steam turbine 42 can advantageously be maximized.

As an alternative to the variant shown in FIG. 5, it can also be provided that the third heat exchanger 50 is co-operating with the second heat exchanger 38 via a common second heat exchange medium circuit 40f, and thus the heat energy which can be supplied to a further heat user is increased analogously to the example of FIG. 2.

Figure 6:
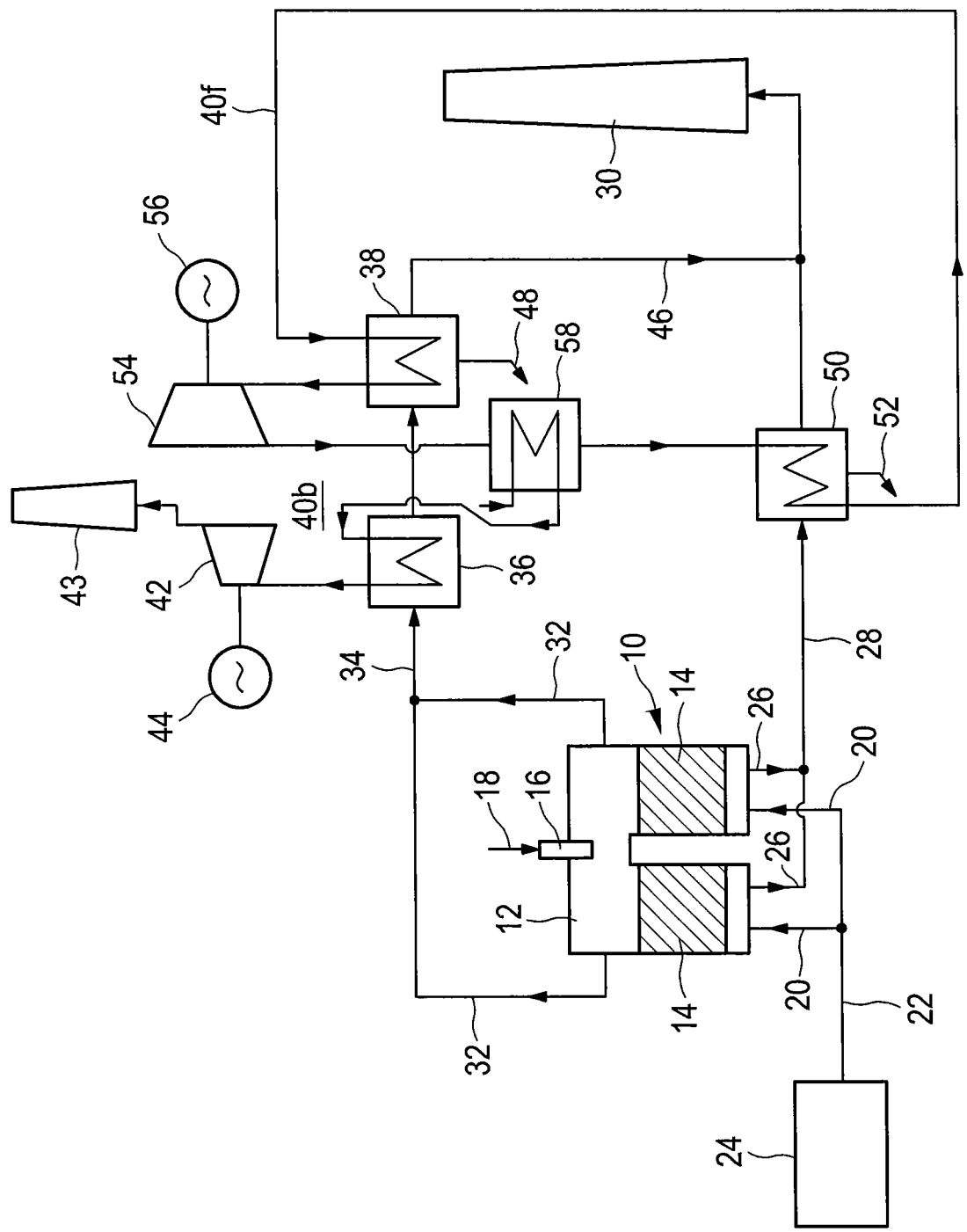
FIG. 6 is a schematic view showing the configuration of a thermal exhaust gas purifying apparatus according to a sixth exemplary embodiment.

Such an embodiment is shown in FIG. 6 as a sixth exemplary embodiment. Identical or analogous components are identified by the same reference numerals, and a repetition of the corresponding description is omitted. In this embodiment, the second heat exchange medium circuit 40f is configured as a working medium circuit of a Rankine cycle. The working medium, and thus the second heat exchange medium is preferably an organic working medium which, in particular at lower temperature levels, has more favorable evaporation properties than the medium water of the steam turbine 42. The second heat exchanger 38 thereby serves as an evaporator for the working medium, which is subsequently expanded via a Rankine turbine 54. The Rankine turbine 54 drives a further generator 56. Alternatively, it can also be provided that the Rankine turbine 54 is operatively correlated with the shaft of the generator 44 via a coupling or transmission system, whereby a second generator could be omitted. Further, the working medium expanded in the Rankine turbine 54 is cooled down by means of a condenser 58 such that it condenses out again. Subsequently, it is supplied in a predominantly liquid form to the third heat exchanger 50. The third heat exchanger 50 transfers the residual and/or evaporation enthalpy of the clean gas of the thermal reactor 10 to the liquid working medium, as a result of which the latter is preheated and possibly even partially evaporated.

It may also be advantageous, in particular in case of integrating an RC/ORC system, if the second and/or third heat exchanger 38, 50 is designed in the manner of a flow apparatus or a system of flow apparatuses according to DE 10 2014 201 908 A1. The disclosure of DE 10 2014 201 908 A1 is hereby incorporated by reference in its entirety, in particular with regard to the structure of the flow apparatus, the flow guidance in the flow apparatus, a system of flow apparatuses and the operating method for fluid management in the flow apparatus.

Figure 7:
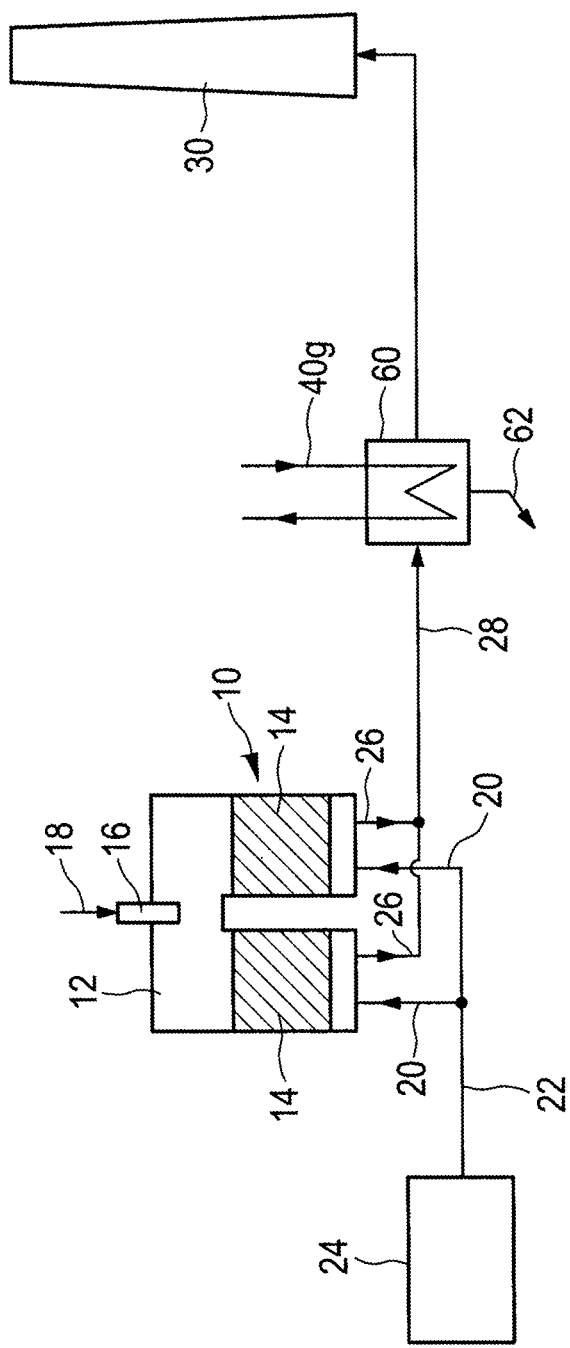
FIG. 7 is a schematic view showing the configuration of a thermal exhaust gas purification apparatus according to a seventh exemplary embodiment.

In known regenerative thermal reactors 10 without a hot gas utilization via the second outlet line 34 and an energy recovery means in the sense of the exemplary embodiments according to FIGS. 1 to 6 and WO 2008/011965 A1, it can also be reasonable and advantageous to provide a condensation heat exchanger 60 (for example in the manner of the third heat exchanger 50 according to the example of FIG. 5) in the first outlet line 28, as illustrated in FIG. 7 as a seventh exemplary embodiment.

In this case, the clean gas flowing out in the clean gas line 28 cools down in the condensation heat exchanger 60 below a dew point of a steam component. As a result, the residual and/or evaporation enthalpy which has not been recovered in the regenerators 14 of the regenerative thermal reactor 10 can be transmitted to a heat exchange medium of a corresponding heat exchange medium circuit 40g. Thus, for example, the incoming raw gas can be preheated analogously to the exemplary embodiment according to FIG. 3. Alternatively, another heat user, for example a warm or hot water supply or an ORC system, can also be supplied with heat energy.

Figure 8:
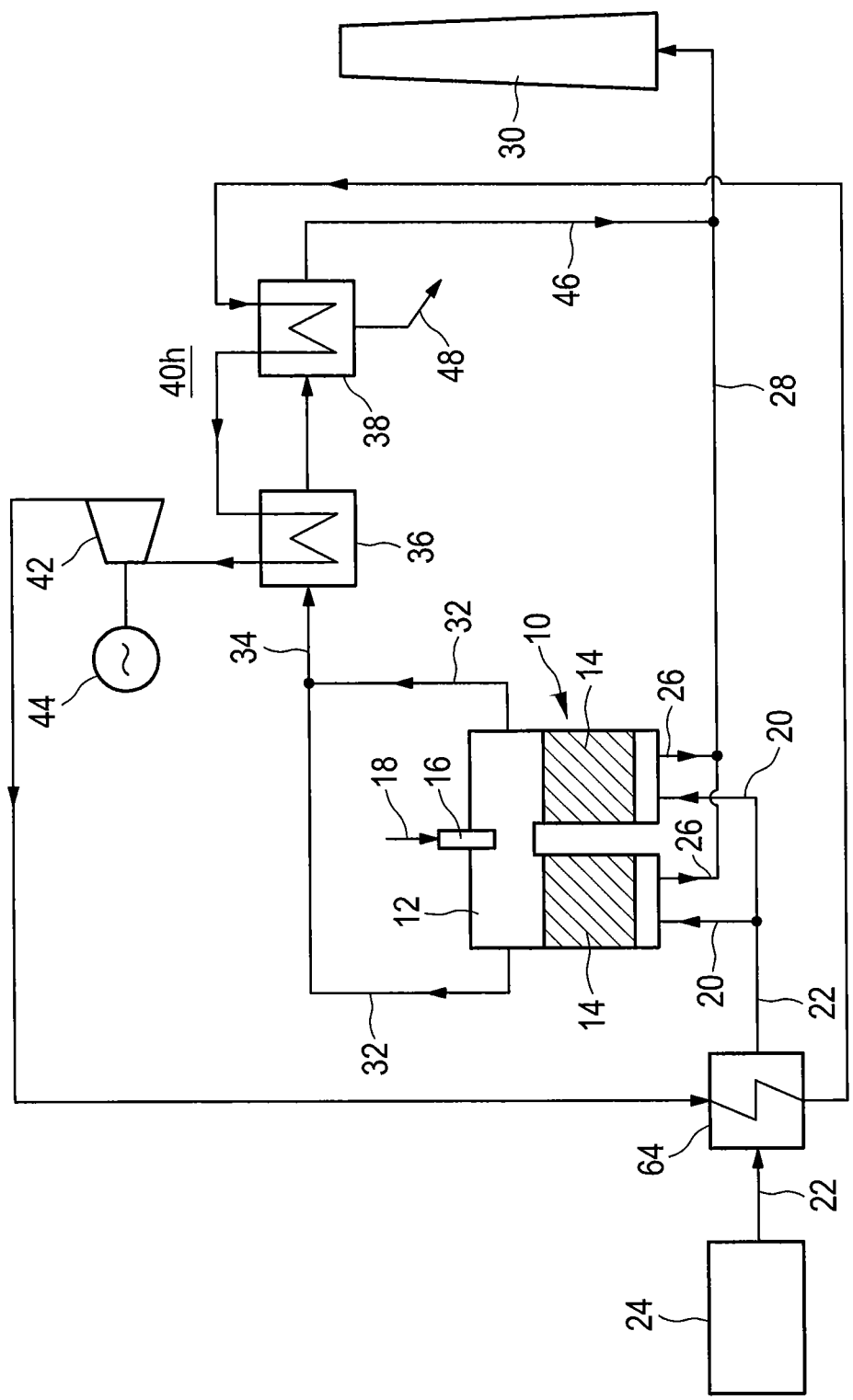
FIG. 8 is a schematic view showing the configuration of a thermal exhaust gas purification apparatus according to an eighth exemplary embodiment.

FIG. 8 shows, as an eighth exemplary embodiment of an exhaust gas purification apparatus according to the invention, a further modification of the exemplary embodiment of FIG. 1. Identical or analogous components are identified by the same reference numerals, and a repetition of the corresponding description is omitted.

The exhaust gas purification apparatus illustrated in FIG. 8 differs from that of the first exemplary embodiment in the energy recovery means.

The first heat exchanger 36 and the second heat exchanger 38 are in heat exchange with a common heat exchange medium circuit 40h. Downstream of the steam turbine 42, the heat exchange medium is supplied to a further condensation heat exchanger 64 which is arranged upstream of the thermal reactor 10 in the raw gas supply line 22. The heat exchange medium cooled down in this further condensation heat exchanger 64 to, for example, about 60° C. is then supplied back to the condensation heat exchanger 38 upstream of the first heat exchanger 36.

LIST OF REFERENCE SIGNS 10 thermal reactor
12 combustion chamber
14 regenerators
16 burner
18 gas supply
20 raw gas branch line
22 raw gas supply line
24 exhaust gas source
26 clean gas branch line
28 first outlet line, clean gas line
30 vent stack
32 hot gas branch line
34 second outlet line, hot gas line
36 first heat exchanger, further heat exchanger
38 second heat exchanger, condensation heat exchanger
40a-h heat exchange medium circuits
42 steam turbine
43 cooling tower
44 generator
46 connecting line
48 condensate drain
50 third heat exchanger, condensation heat exchanger
52 condensate drain
54 Rankine turbine
56 generator
58 condenser
60 fourth heat exchanger, further condensation heat exchanger
62 condensate drain
64 fifth heat exchanger, condensation heat exchanger

The invention claimed is:

1. An apparatus for thermal exhaust gas purification, comprising:
   a thermal reactor connected to a raw gas supply line for supplying a raw gas to the thermal reactor and comprising a combustion chamber for thermally purifying the supplied raw gas; and
   an energy recovery means connected to said combustion chamber of said thermal reactor via an outlet line for supplying a purified gas resulting from the thermal purification process in said combustion chamber to said energy recovery means,
   wherein said energy recovery means comprises:
   a first heat exchanger for cooling down the purified gas to a first temperature level and transmitting an enthalpy released thereby to a heat exchange medium; and
   at least one condensation heat exchanger arranged downstream of said first heat exchanger for further cooling down the purified gas to a second temperature level lower than the first temperature level such that condensable substances contained in the purified gas condense and enthalpies released thereby are transmitted to a heat exchange medium and/or the raw gas upstream of said thermal reactor.

2. The apparatus according to claim 1, wherein said further heat exchanger and said condensation heat exchanger are in heat exchange with a common heat exchange medium circuit, wherein said condensation heat exchanger is arranged upstream of said further heat exchanger in said common heat exchange medium circuit.

3. The apparatus according to claim 1, wherein said further heat exchanger is in heat exchange with a first heat exchange medium circuit, and said condensation heat exchanger is in heat exchange to a second heat exchange medium circuit being separate from said first heat exchange medium circuit.

4. The apparatus according to claim 1, wherein said further heat exchanger is in heat exchange with a first heat exchange medium circuit, and said condensation heat exchanger is in heat exchange with a raw gas supply line upstream of said thermal reactor.

5. The apparatus according to claim 1, wherein a further condensation heat exchanger being in heat exchange with a raw gas supply line upstream of said thermal reactor is provided downstream of said further heat exchanger in said common heat exchange medium circuit.

6. The apparatus according to claim 1, wherein there is provided a first heat exchange medium circuit being in heat exchange with said further heat exchanger or a common heat exchange medium circuit being in heat exchange both with said further heat exchanger and said condensation heat exchanger, and a power generating device is arranged downstream of said further heat exchanger in said common heat exchange medium circuit or said first heat exchange medium circuit.

7. The apparatus according to claim 3, wherein at least one device selected from a hot water consumer, a district heating terminal and an RC or ORC system is arranged downstream of said condensation heat exchanger in said second heat exchange medium circuit.

8. The apparatus according to claim 1, wherein a condensate generated in said condensation heat exchanger is recycled to the process via a condensate drain.

9. The apparatus according to claim 1, wherein said thermal reactor is a thermal oxidation reactor, preferably a regenerative thermal oxidation reactor.

10. The apparatus according to claim 1, wherein said raw gas is one of a mine exhaust gas, in particular a Ventilation Air Methane or a mixture of Ventilation Air Methane and Coal Mine Methane, and an exhaust gas containing combustible constituents, in particular containing VOC.

11. The apparatus according to claim 1, wherein said raw gas is a raw gas containing liquid drops.

12. A method for thermal exhaust gas purification, comprising the steps of:
   thermally purifying a raw gas to be purified in a combustion chamber of a thermal reactor;
   cooling down a purified gas produced during the thermal purification process in said combustion chamber to a first temperature level in a first heat exchanger, wherein an enthalpy released thereby is transmitted to a heat exchange medium; and
   further cooling down the purified gas in a condensation heat exchanger downstream of said first heat exchanger to a second temperature level lower than the first temperature level such that condensable substances contained in the purified gas condense and enthalpies released thereby are transmitted to a heat exchange medium and/or the raw gas upstream of said thermal reactor.

13. The method according to claim 12, wherein said further heat exchanger and said condensation heat exchanger are in heat exchange with a common heat exchange medium circuit, and the heat exchange medium of said common heat exchange medium circuit is preheated in said condensation heat exchanger.

14. The method according to claim 12, wherein said further heat exchanger is in heat exchange with a first heat exchange medium circuit, and said condensation heat exchanger is in heat exchange with a second heat exchange medium circuit being separate from said first heat exchange medium circuit.

15. The method according to claim 12, wherein said further heat exchanger is in heat exchange with a first heat exchange medium circuit, and said condensation heat exchanger is in heat exchange with a raw gas supply line upstream of said thermal reactor.

16. The method according to claim 12, wherein a further condensation heat exchanger being in heat exchange with a raw gas supply line upstream of said thermal reactor is provided downstream of said further heat exchanger in said common heat exchange medium circuit.

17. The method according to claim 12, wherein the heat exchange medium heated in said further heat exchanger is used for generating electricity.

18. The method according to claim 14, wherein the heat exchange medium of said second heat exchange medium circuit is a process water or a heating medium.

19. The method according to claim 12, wherein a condensate generated in said condensation heat exchanger is recycled to the process via a condensate drain.

20. The method according to claim 12, wherein said raw gas is one of a mine exhaust gas, in particular a Ventilation Air Methane or a mixture of Ventilation Air Methane and Coal Mine Methane, and an exhaust gas containing combustible constituents, in particular containing VOC.

21. The method according to claim 12, wherein said raw gas is a raw gas containing liquid drops.

* * * * *